United States Patent [19]

Povlacs

Best Available Copy

[11] E Re. 30,410

[45] Reissued Oct. 7, 1980

[54] APPARATUS FOR LOADING PROPHYLACTIC DEVICES ON TEST APPARATUS

[75] Inventor: Lawrence Povlacs, Dothan, Ala.

[73] Assignee: The Akwell Corporation, Akron, Ohio

[21] Appl. No.: 401,908

[22] Filed: Sep. 28, 1973

Related U.S. Patent Documents

Reissue of:

[64] Patent No.: 3,391,803
Issued: Jul. 9, 1968
Appl. No.: 541,814
Filed: Apr. 11, 1966

[51] Int. Cl.[3] ..... B65G 51/02

[52] U.S. Cl. ..... 406/87; 193/47; 198/396; 209/543; 209/572; 209/906; 221/171; 414/755

[58] Field of Search ..... 214/1 AB, 1 B, 16.4 R, 214/1 BE, 1 BC; 209/73, 81 R; 302/2 R, 12; 221/156, 171; 193/43 R, 44, 47; 198/281, 382, 393, 396; 414/676, 744 R, 744 A, 755

[56] References Cited

U.S. PATENT DOCUMENTS

| | | | |
|---|---|---|---|
| 1,901,928 | 3/1933 | Olson | 214/16.4 |
| 2,109,150 | 2/1938 | Killian | 223/1 |
| 2,221,323 | 11/1940 | Gammeter | 209/81 |
| 2,622,129 | 12/1952 | Killian | 209/81 |
| 2,994,561 | 8/1961 | Kelley | 302/12 |
| 3,194,389 | 7/1965 | Gregtic | 214/1 BC X |

*Primary Examiner*—Robert G. Sheridan
*Assistant Examiner*—George F. Abraham
*Attorney, Agent, or Firm*—Pearne, Gordon, Sessions

[57] ABSTRACT

A machine for automatically handling thin tubular rubber articles such as prophylactic devices or the like including a vacuum pickup to retrieve randomly oriented articles and deliver such articles to a pneumatic conveyor. The pneumatic conveyor includes a tube with air blowing therethrough to transfer the articles to a delivery position. An orienter is provided in the conveyor tube so that the article is delivered closed end first at the delivery position. At the delivery position a mandrel is provided which includes a support adapted to loosely support the article in position to receive a mandrel. Grippers grip the open end of the article on the support and hold it against movement with the mandrel while the mandrel is inserted into the article.

25 Claims, 22 Drawing Figures

82
84
86
8a
8a
86
83
27a
52
53

82
84

10
101
13
29
106
28a
88
87
12
69
66
65
68
76
67
78
71
16
71
74
81
79
77
72
68
74
13
11
101
131
121
119
82
27a
52

67
71
79
68
71

13
74
72
81
79
73
68
71
11
10

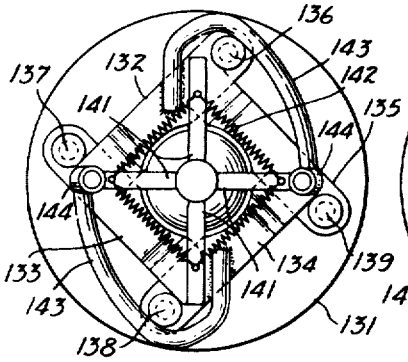
Fig. 16
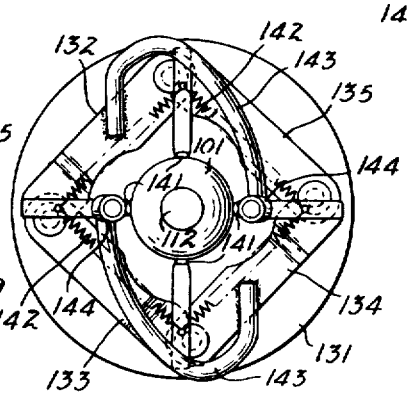
Fig. 18
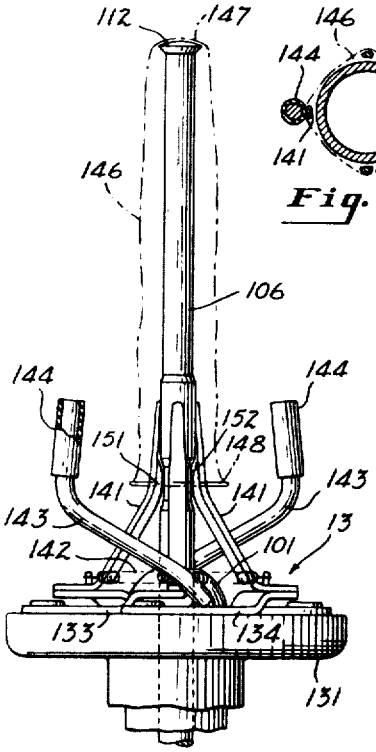
Fig. 17
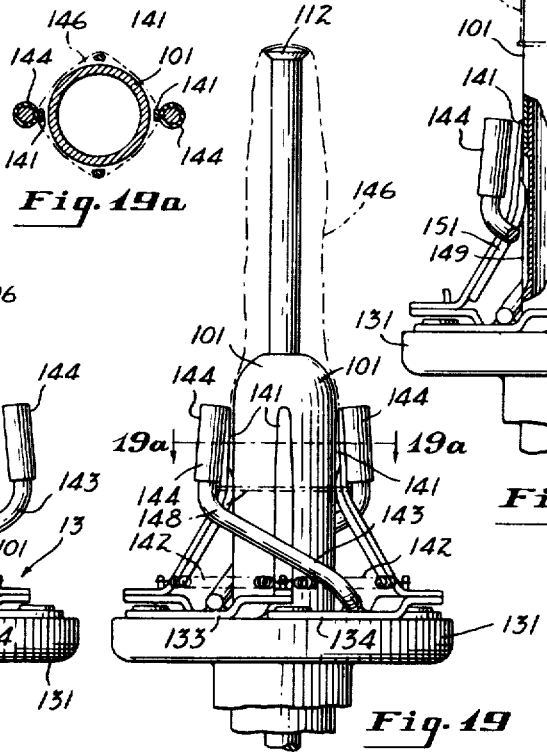
Fig. 19
Fig. 19a
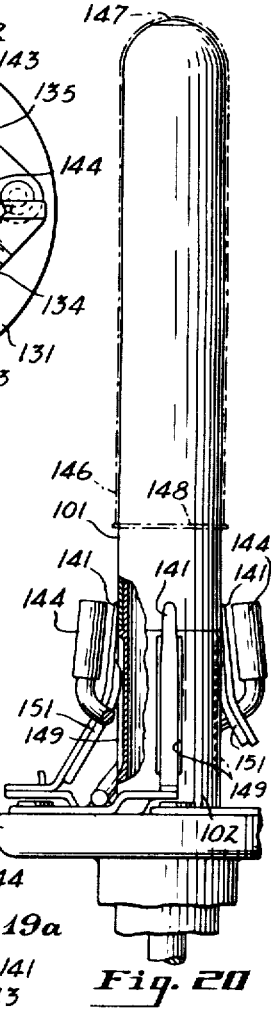
Fig. 20

APPARATUS FOR LOADING PROPHYLACTIC DEVICES ON TEST APPARATUS

Matter enclosed in heavy brackets [ ] appears in the original patent but forms no part of this reissue specification; matter printed in italics indicates the additions made by reissue.

This invention relates generally to article handling apparatus and more particularly to automated machines for testing, branding, and sorting thin rubber articles after manufacture thereof.

In the manufacture of thin tubular rubber articles, such as prophylactic devices, it has been customary to manually place the individual articles on a test mandrel of a machine which thereafter automatically imprints on the article the brand name and tests the article for imperviousness. In such machines the printing, testing and discharging of the articles has been fully automated to reduce manufacturing costs. Such prior art machines are disclosed generally in U.S. Pat. Nos. 2,221,323, 2,320,516 and 2,371,818.

The present invention completely automates the *retrieval of such thin, rubber articles from a randomly oriented supply of the articles and the* branding, testing, and sorting of [such thin, rubber] *the* articles by providing means for automatically stretching such articles over the test mandrel. Randomly oriented articles are supplied to the machine in a supply container. The machine automatically operates to pick up individual randomly oriented articles and deliver such articles to a pneumatic conveyor. The pneumatic conveyor orients the articles during passage therethrough and delivers a single oriented article to each of a plurality of mandrel assemblies. The mandrel assemblies are constructed and arranged to loosely support the articles delivered by the conveyor in a predetermined position in which they are automatically gripped and pulled over a test mandrel. Once the articles are placed on the test mandrel they are automatically carried past the printing location, testing location, and discharge location. Consequently, with a machine incorporating the present invention the *retrieval and mounting of the articles, as well as the* branding, testing, and sorting [of randomly oriented, thin, rubber articles] *thereof,* is completely automated and manufacturing costs are minimized.

It is an important object of this invention to provide a novel and improved machine for automatically positioning thin, rubber articles on a test mandrel.

It is another important object of this invention to provide a machine for handling thin, rubber articles, such as prophylactic devices, which is adapted to receive such articles in a randomly oriented condition and deliver individual articles in a predetermined orientation so that such articles may be placed on a test mandrel, or the like.

It is still another object of this invention to provide a novel and improved article handling machine adapted to receive randomly oriented, thin, rubber articles and automatically position individual articles on a testing mandrel.

It is still another object of this invention to provide a novel and improved machine, according to any of the preceding objects, including pneumatic conveyor means which receive randomly oriented articles and which automatically [operates] *operate* to provide a predetermined orientation of such articles as they pass through the conveyor means.

It is still another object of this invention to provide a novel and improved test mandrel assembly for thin rubber articles including a support operable to loosely support such article in a position in alignment with a mandrel, gripper means for gripping one end of an article supported by the support means and power means operable to produce movement of the mandrel into an article gripped by the gripper means and supported by the support means.

Further objects and advantages will appear from the following description and drawings wherein:

FIG. 16 is an end view of the gripper structure of the mandrel assembly illustrating the gripper elements in the release position;

FIG. 17 is a fragmentary side elevation of the elements shown in FIG. 16;

FIG. 18 is an end view similar to FIG. 16 illustrating the gripper elements in the operated or gripping position;

FIG. 19 is a fragmentary side elevation illustrating the elements of the gripper in the gripping position of FIG. 18;

FIG. 19a is a fragmentary section taken along line 19a—19a of FIG. 19; and,

FIG. 20 is a fragmentary side elevation similar to FIGS. 17 and 19 illustrating the position of the elements when the mandrel is fully extended and the article is mounted thereon.

Figure 1:
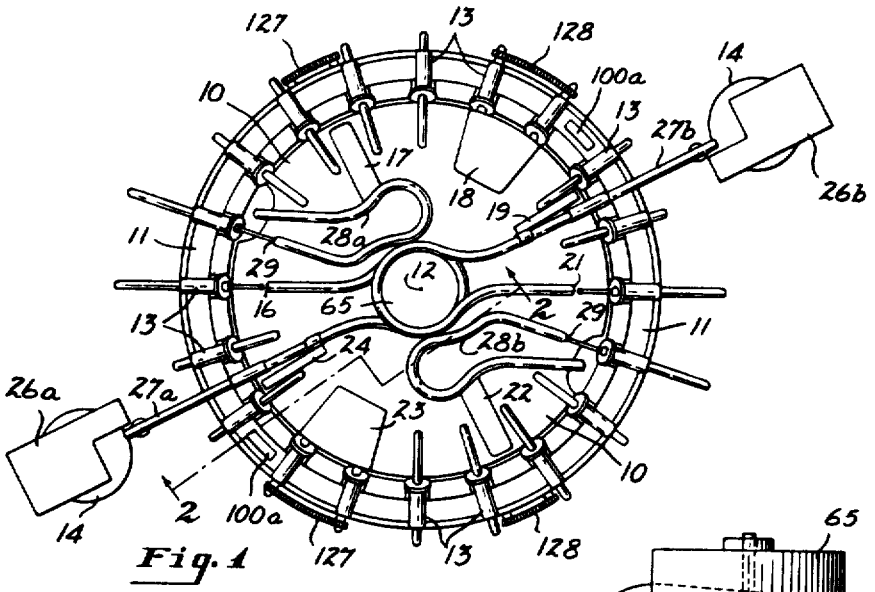
FIG. 1 is a schematic plan view of a testing, branding and sorting machine incorporating this invention.

FIG. 1 illustrates a complete branding and testing machine incorporating this invention. The machine includes a stationary circular table 10 with an annular ring 11 supported on the table for rotary movement around the central axis 12 of the table. Symmetrically mounted on the ring 11 are a plurality of mandrel assemblies 13 which are carried around the table 10 by rotation of the ring 11. The thin rubber articles, such as prophylactic devices, are loosely supplied to the machine in two containers 14 located on opposite sides of the table 10.

The machine is arranged so that during one complete revolution of the ring 11 two complete machine cycles are performed with one cycle occurring as the mandrel assemblies 13 are carried through 180° from a first loading station 16, past a first printing or branding station 17, testing station 18, and a first discharge station 19. The second complete cycle occurs as the mandrel assemblies 13 are carried through a second arc of 180° past a second loading station 21, a second printing or branding station 22, a second testing station 23 and a second discharge station 24.

There are two similar pick up transfer mechanisms 26a and 26b with one associated with each of the containers 14. These pickup mechanisms function to individually pick up randomly oriented articles from their associated containers 14 and position them at the inlet end of an associated pneumatic conveyor 27a and 27b, respectively. The conveyor 27a operates to deliver oriented articles to the first loading station 16 and the conveyor 27b operates to deliver oriented articles to the second loading station 21.

In some instances an article is not properly positioned on the mandrel assemblies 13 at the loading stations 16 and 21. Such improperly positioned articles are removed by pneumatic conveyors 28a and 28b, respectively, as they are carried past the inlets 29 of the conveyors 28a and 28b. The conveyors 28a and 28b discharge such articles back into the associated containers 14.

Preferably, the testing stations 18 and 23 are arranged to provide electrical testing for size and imperviousness of the articles carried past these stations by the mandrels. The U.S. Pat. No. 2,320,516, discloses a testing arrangement of the general type which may be used at the two testing stations. The discharge stations 19 and 24 each include duplicate devices of the general type illustrated in the U.S. Pat. No. 2,371,818. One such device at each discharge station is activated to discharge articles that fail to pass the test into a reject container. The other device at each discharge station preferably rolls satisfactory articles off of each mandrel into a container receiving the finished articles suitable for sale. Such articles are then packaged. The testing and discharge apparatus, along with the branding apparatus, are known to persons skilled in the art and form no part of this invention except in combination with the means for automatically positioning the articles on the mandrels. Therefore, the structural details of these subassemblies [has] *have* not been illustrated.

Figure 2:
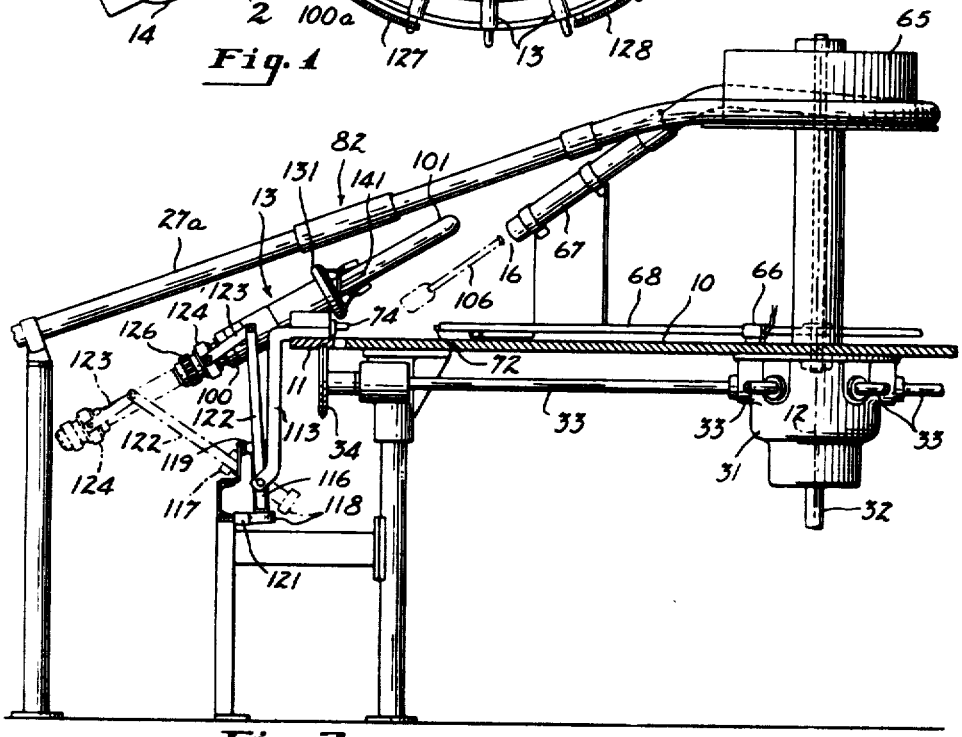
FIG. 2 is an enlarged fragmentary section taken generally along line 2—2 of FIG. 1 illustrating the pneumatic conveyor and testing mandrel arrangement.
Figure 3:
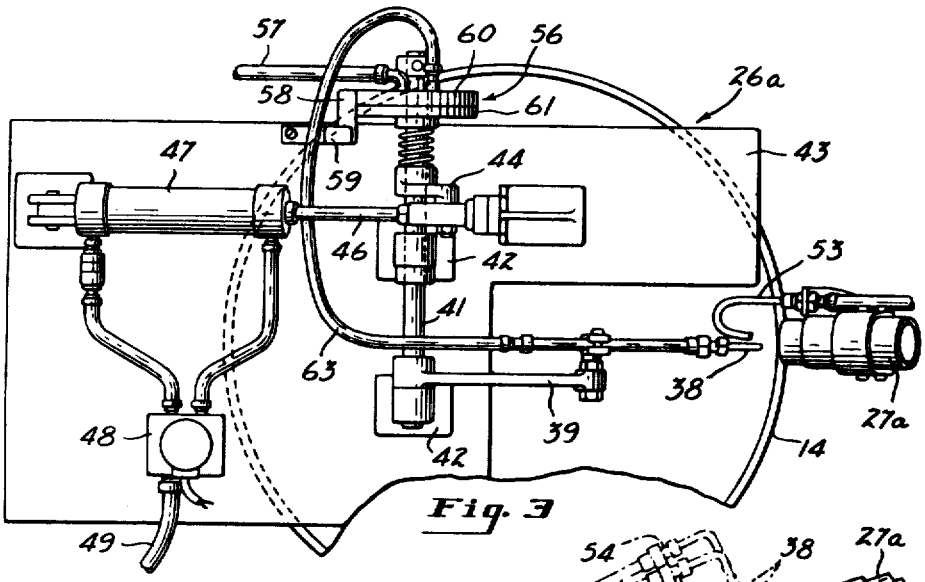
FIG. 3 is a plan view of the transfer apparatus for removing individual randomly oriented articles from the supply container and delivering such articles to the pneumatic conveyor.
Figure 4:
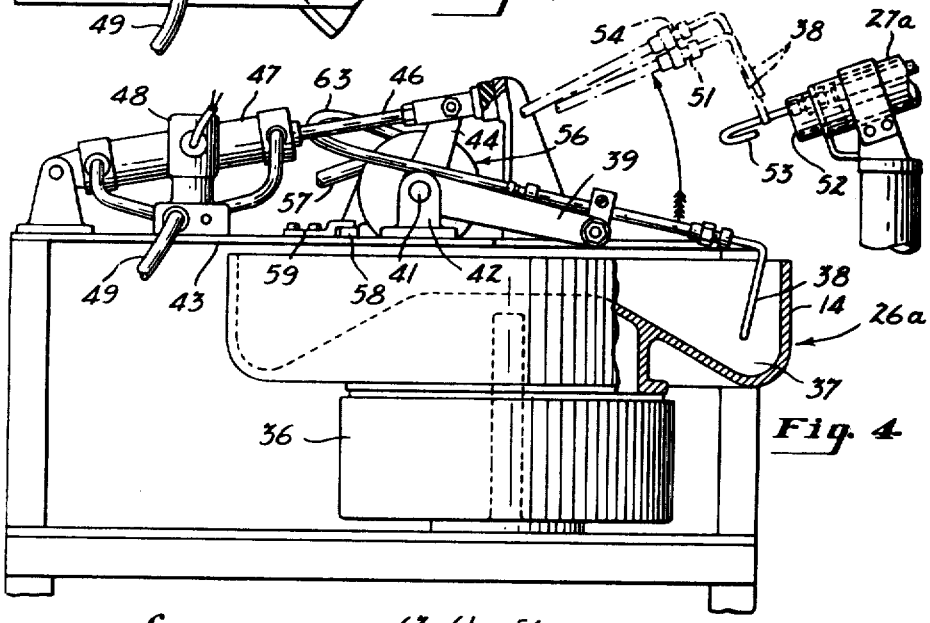
FIG. 4 is a side elevation of the transfer apparatus illustrated in FIG. 3.

Referring to FIG. 2, the ring 11 is powered by a multiple output gear box 31 having a drive shaft 32 connected to a suitable electric motor (not shown). The gear box 31 is provided with a plurality of output shafts 33 symmetrically and radially extending from the gear box 31, each of which is driven by the drive shaft 32. Mounted at the outer end of each of the output shafts 33 is a drive gear 34 engaging a circular gear section on the underside of the ring 11 to provide for the rotary drive of the ring 11.

FIGS. 3 through 6 illustrate the structural detail of the transfer or pick up mechanism 26a. The container 14 is provided with power means 36 which vibrate the container and rotate it about its central axis, so that the loose randomly oriented articles are uniformly distributed in an annulus at 37 adjacent to the periphery of the container 14. A vacuum pick up tube 38 is mounted on an arm 39 which is in turn mounted on a pivot shaft 41. The pivot shaft 41 is journaled in bearing members 42 secured to a support table 43.

A second arm 44 mounted on the shaft 41 is connected to the piston 46 of a pneumatically operated actuator 47. The actuator 47 is of the double-acting type controlled by a solenoid valve 48 supplied with compressed air through a pressure line 49. When the piston 46 is in the extended position of FIGS. 3 and 4 the end of the pickup tube 38 extends down into the container 14 into the area 37 where the articles are loosely located. Vacuum applied to the pick up tube 38 causes a single article to be held against the end of the pick up tube during the retraction of the piston 46 until the pick up arm is raised to the phantom position 51. In this position the end of the pick up arm is located adjacent to the entrance 52 of the pneumatic conveyor 27a. At this point in the operation the vacuum is released and the article is blown into the conveyor 27a by an air jet from a nozzle 53 supplied with compressed air and positioned to blow air along the conveyor tube 27a. Over travel is provided so that as the piston 46 continues to retract the tube 38 is carried to the phantom position 54 above the entrance 52. This insures that the control valve controlling the vacuum on the tube 38 operates to release the vacuum and insures that the article is released from the tube and carried along the conveyor 27a.

Figure 5:
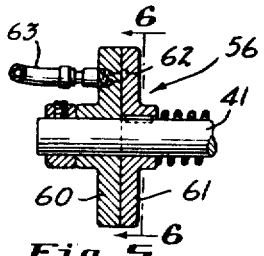
FIG. 5 is a fragmentary view partially in section of the control valve for the transfer apparatus of FIGS. 3 and 4.
Figure 6:
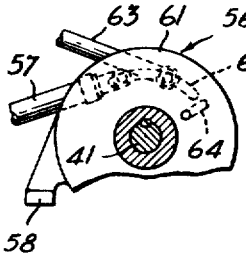
FIG. 6 is a fragmentary view, taken along line 6—6 of FIG. 5.

The vacuum supplied to the pick up tube 38 is controlled by a disc valve 56 which is connected to a vacuum pump by a vacuum line 57. This valve is best illustrated in FIGS. 5 and 6 and includes a nonrotating disc 60 supported on the shaft 41 but held against rotation therewith by a foot extension 58 and a clamp 59 illustrated in FIGS. 3 and 4.

A second disc 61 is keyed to the shaft 41 and rotates therewith when the actuator 47 is operated. The disc 61 is formed with an arcuate channel 62 connecting the vacuum line 57 to the flexible line 63, between the pick up tube 38 and the valve 56, in all positions of the tube 38 between the lower position (shown in full line in FIG. 4) and the phantom position 51. When the tube 38 is lifted beyond the phantom position 51 to the position 54 the tube 38 is vented to atmosphere through a port 64. On the return of the pick up tube 38 from the position 54 to the full line position vacuum is applied as the tube moves through the phantom position 51, but since the article has already been carried up along the conveyor 27a this does not present any problem.

The transfer or pick up mechanism operates to lift a single article from the container 14 and deliver such single article to the entrance 52 of the pneumatic conveyor 27a each time the ring 11 carries a mandrel assembly 13 into the loading position 16. A switch 66 (illustrated in FIG. 2) is electrically connected to the solenoid valve 48 to initiate operation and cause retraction of the piston 46. The valve 48 is arranged to return the piston *to* the extended position whenever the switch 66 is open and initiate retraction only when the switch 66 is closed.

Referring now to FIGS. 7 through 10, the conveyor 27a is a tube, preferably formed of a transparent plastic material, extending around a support pedestal 65. Air is blown by the compressed air jet from the nozzle 53 through the tube to convey the articles from the entrance 52 to the first loading station 16. The exit portion 67 of the tubular pneumatic conveyor [27] *27a* is mounted on an arm 68 pivoted at 69 at the center of the table 10 *in FIGS. 6 and 7.* A pair of rollers 71 support the outer end of the arm 68 for limited oscillating movement back and forth along the surface of the table 10. The tube is sufficiently flexible to allow this movement.

Figures 7, 8, 8A, 9, 10:
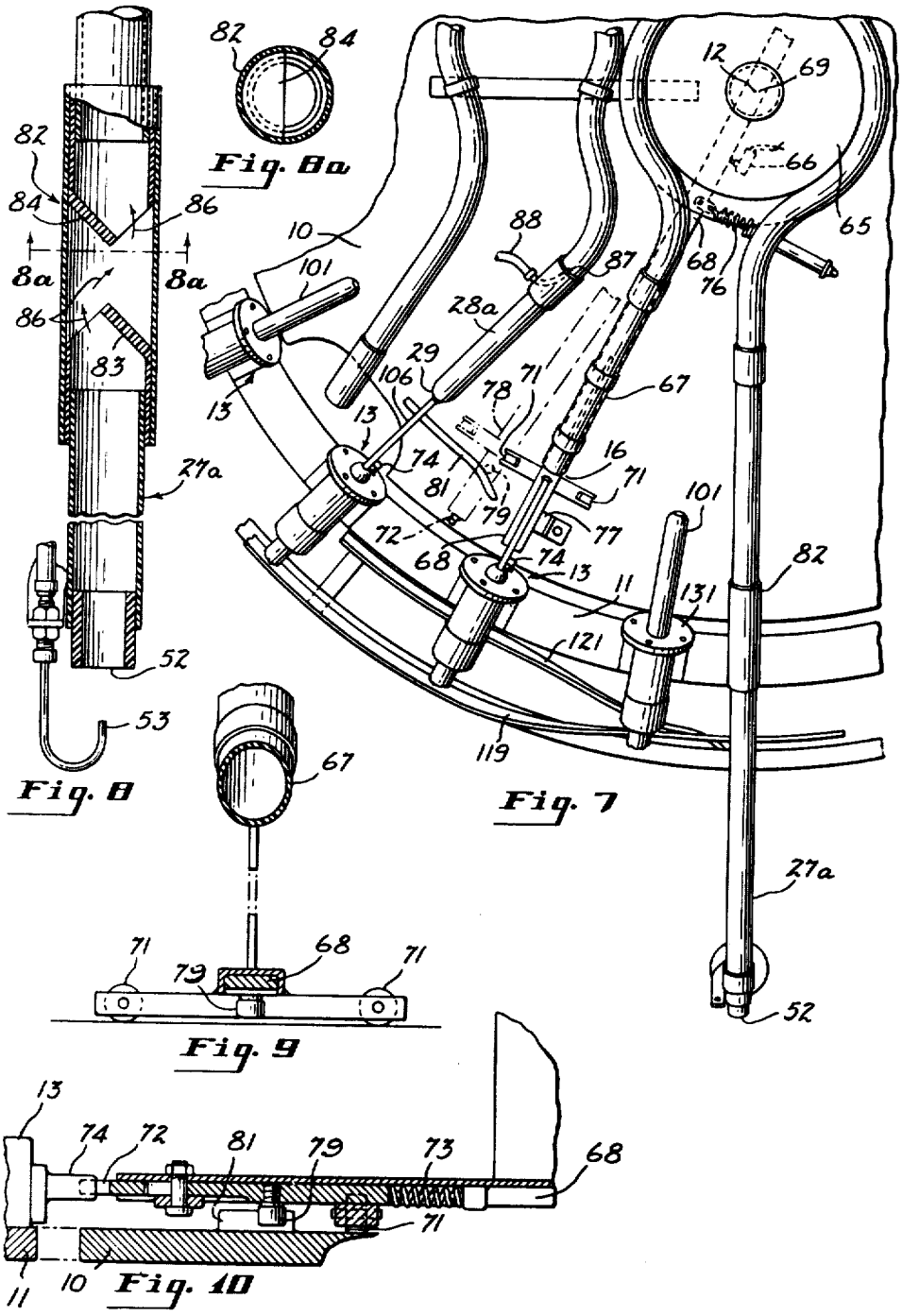
FIG. 7 is an enlarged fragmentary plan view illustrating the pneumatic conveyor and the apparatus for removing improperly positioned articles from the mandrel assemblies.
FIG. 8 is an enlarged fragmentary longitudinal section of the pneumatic conveyor illustrating the structure of the orienter which operates to orient the articles passing through the conveyor.
FIG. 8a is a fragmentary section taken along line 8a—8a of FIG. 8.
FIG. 9 is a fragmentary end view of the conveyor discharge support structure.
FIG. 10 is a fragmentary side elevation partially in section of the support for the conveyor discharge; illustrating the latch structure for maintaining the alignment between the conveyor discharge and the mandrel assembly in the article receiving position.

A spring loaded latch 72 is mounted on the arm 68 and is resiliently urged by a spring 73 toward an extended position illustrated in FIG. 10 in which it engages a projection 74 carried by each mandrel assembly 13 when the exit portion 67 of the conveyor 27a is [an] *in* alignment with the associated mandrel assembly 13. A spring 76 (illustrated in FIG. 7) resiliently biases the arm 68 toward the position of FIG. 7 against a stop 77.

As each mandrel assembly 13 is carried to the loading position 16 the projection 74 of such mandrel assembly 13 engages the latch 72. Continued clockwise movement of the ring 11 causes the mandrel assembly stop 74 to swing the arm 68 in a clockwise direction to the phantom position 78 while maintaining the exit portion 67 of the conveyor tube in alignment with the mandrel assembly. As the arm 68 moves from its normal position against the stop 77 the switch 66 closes and initiates the operation of the pick up mechanism 26a *to raise the pick up tube 38,* which delivers an article to the entrance 52 of the conveyor 27a. The article is then blown along the conveyor to the exit portion and onto the aligned mandrel assembly 13. When the arm 68 reaches the phantom position 78 a cam follower 79 engages a cam 81 on the table and causes the latch 72 to be retracted against the action of the spring 73 until it clears the projection 74. This allows the spring 76 to return the arm 68 to its initial position against the stop 77. Therefore, the exit portion 67 remains in alignment with each of the mandrel assemblies 13 as they are carried past the loading station 16 for a sufficient period of time to allow an article to be placed in the conveyor and [carrier] *carried* through the conveyor to its position on the mandrel assembly. Return of the arm to its normal position against the stop opens the switch 66 [and returns] *which causes the piston 46 of the pick up mechanism to be extended for returning* the pick up tube to its lower position.

As the articles enter the entrance 52 of the pneumatic conveyor tube 27a they are in a randomly oriented condition. However, as they are carried through the conveyor tube they assume an oriented condition with the closed end of the article forward and the open end of the article trailing. Also, the articles are inflated to an open condition.

Prophylactic articles consist of a thin, tubular central section closed at one end and provided with an increased thickness ring at the other end. This ring, because of the natural resiliency of the material tends to extend and maintain a circular condition.

In order to obtain the proper orientation of the articles as they move through the pneumatic conveyor an orienter 82 is provided. The structure of the orienter is best illustrated in FIGS. 8 and 8a. The orienter includes a first diagonal wall 83 extending about half way across the passage of the conveyor at an angle of about 45° to the longitudinal axis of the conveyor. A second similar wall 84 extends diagonally in from the opposite side of the orienter 82 at a point axially downstream along the orienter 82 in a direction substantially parallel to the first wall.

The two walls provide spaced passage restrictions and changes in the direction of movement of articles passing therethrough, as illustrated by the arrows 86. As the articles exit from the orienter 82 they are in the desired oriented condition with the closed end forward and the open ring end extending across the conveyor in a trailing condition. It is believed that the stiffness of the ring at the open end of the article in combination with the interrupted movement path through the orienter produces this desired orientation.

Preferably, the tubes forming the conveyor 27a have an internal diameter substantially equal to the outer diameter of the open end of the article. The continued movement of the article to the exit position occurs with the proper orientation maintained.

The conveyor 28a is provided with an inlet 29 past which the mandrel assemblies 13 move *(FIGS. 1 and 7)* and in the event an article is improperly positioned on the mandrel [the] *a* vacuum at the inlet 29 removes the improperly positioned article and carries such article along the conveyor tube 28a. The vacuum for the conveyor 28a is produced by a nozzle 87 supplied with compressed air by a supply line 88 connected to any suitable pump. If an article is properly positioned on the mandrel assembly, in the manner which will be described in detail below, the affect of the vacuum at the entrance 29 is not sufficient to remove the article from the mandrel assembly 13.

Referring now to FIGS. 11 through 15, each mandrel assembly 13 includes a housing 91 mounted on the ring 11. Journaled on spaced bearings 92 in the housing 91 is a support sleeve 93 axially fixed and rotatable relative to the housing 91. The rearward end of the support sleeve 93 extends beyond the rearward end 94 of the housing 91 and is slotted to receive a mounting member 96 secured to a ring 97 adjacent the rearward end of the support sleeve 93. The mounting member 96 in turn supports a tubular element 98 having a through bore 99 coaxial with the support sleeve 93. With this arrangement the tubular element 98 is supported for rotation with the support sleeve 93 and is fixed against axial movement relative thereto.

A cam ring 100 is mounted on the rearward end of each support sleeve 93 adjacent to the mounting member 96. The cam ring 100 is provided with a pair of oppositely extending projections which cooperate with track segments 100a to insure proper positioning of the support sleeve. As the mandrels pass the track segments the projections turn the support sleeve 93 and in turn the gripper arms 144 (described in detail below) so that the arms do not interfere with the structure of the discharge apparatus at 19 and 24.

A tubular mandrel 101 is mounted on the end of a tube 102 and is guided by bearings 103 on the support sleeve 93 for axial reciprocation relative to the support sleeve. The tube 102 is provided with an axially extending slot 104 through which the mounting member 96 projects, so the tube 102 and in turn the mandrel 101 are fixed against rotation relative to the support sleeve. A roller bearing 105 engages one or the other of the walls of the slot to prevent wear. The mechanism for axially moving the mandrel 101 is described in detail below.

Centrally located within the mandrel 101 is an article support rod 106. The article support rod 106 extends through the bore 99 in the sleeve member 98 and an opening [106] *106a* in the forward end of the mandrel 101. A spring 109 extends between the tubular element 98 and a shoulder 108 on the rod 106 and urges the rod in a rearward direction. An adjustable ring 111 secured to the support rod 106 is normally maintained against the forward [side] *end* of the tubular element 98 by the spring 109. With this structure the rod 106 is normally maintained in the illustrated position and is movable therefrom in a forward direction.

Figures 11, 12, 13, 14, 15:
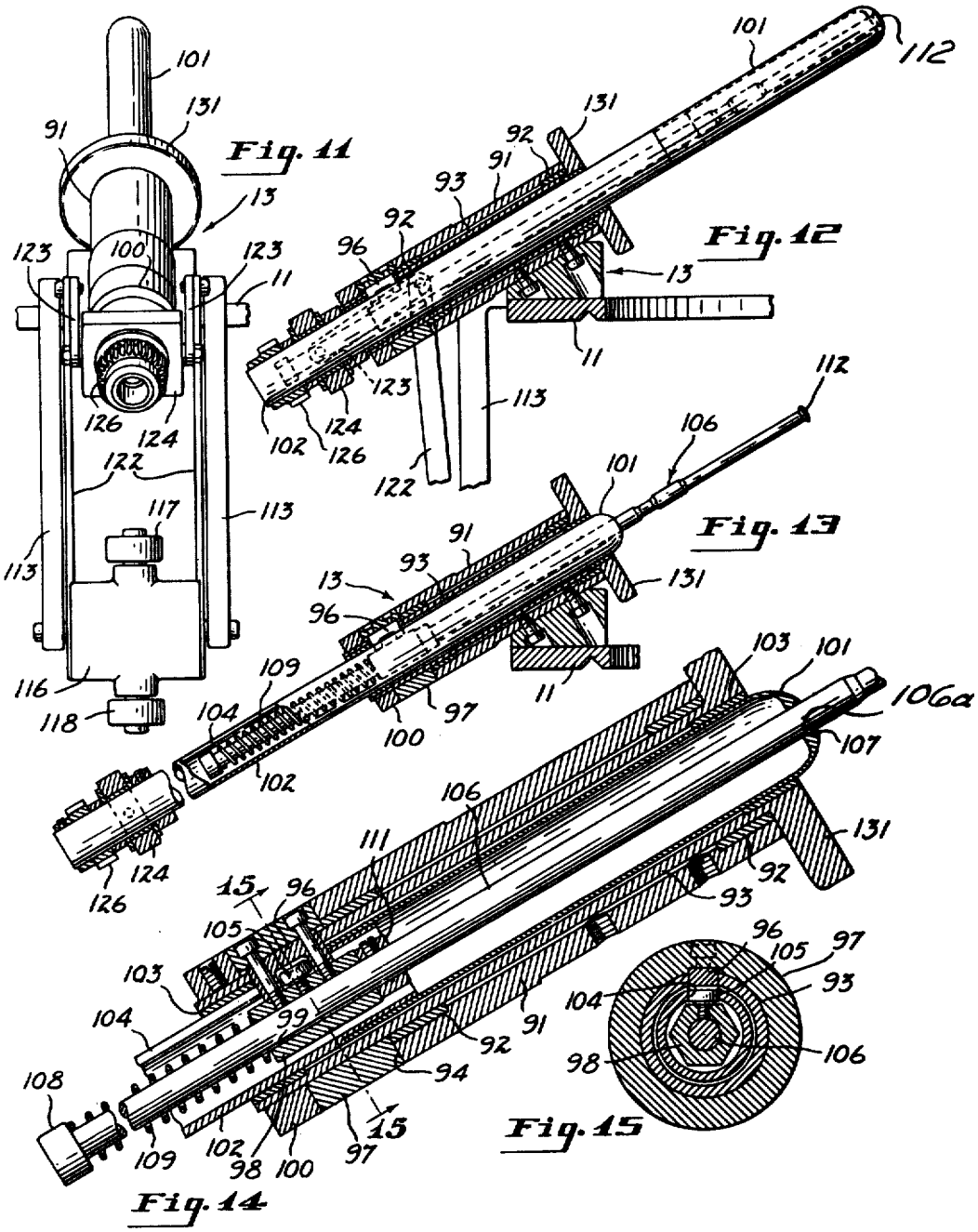
FIG. 11 is an enlarged end elevation of the mandrel assembly.
FIG. 12 is a fragmentary side elevation of the mandrel assembly, with parts removed for purposes of illustration, illustrating the mandrel in the fully extended position.
FIG. 13 is a fragmentary side elevation similar to FIG. 12 with the mandrel illustrated in the retracted position.
FIG. 14 is an enlarged fragmentary section of the mandrel assembly illustrating the structural detail of the mounting of the mandrel and article support rod.
FIG. 15 is a cross-section taken along line 15—15 of FIG. 14.

The mandrel 101 is movable from a retracted position, illustrated in FIG. 13, to an extended position, illustrated in FIG. 12. When the mandrel is in the retracted position the article support rod 106 extends beyond the end of the mandrel, as illustrated in FIG. 13. Movement of the mandrel to the extended position causes the end of the mandrel 101 to telescope over the rod to a position with its end adjacent to the end 112 of the article support rod 106. Continued movement to the extended position of FIG. 12 causes the mandrel and article support rod to move together.

Depending support arms 113 extend downwardly from the ring 11 and provide a pivot support for a cam follower block 116, illustrated in FIGS. 2 and 11. A pair of cam followers 117 and 118 are mounted on the block 116 and are positioned to engage cam tracks 119 and 121, respectively. These tracks are best illustrated in FIGS. 2 and 7 and are positioned so that as the followers 117 and 118 are carried around the table 10 by the ring member 11 the followers engage the cam tracks and produce predetermined oscillation of the cam support block 116. Secured to the cam support *block* 116 are a pair of arms 122 which extend upwardly and connect to links 123 at one end thereof. The other ends of the links 123 are pivotally connected to a block member 124 mounted on the rearward end of the tube member 102 in such a manner that it is axially fixed relative thereto but is free for relative rotation. Consequently, rotation of the tubular member 102 does not produce rotation of the block member 124, since much rotation is resisted by the links 123 and 123. However, pivotal movement of the follower support block 116 produced by the cam tracks 119 and 121 produces retraction and extension of the tube member 102 and in turn retraction [of] *and* extension of the mandrel 101.

The cam tracks 119 and 121 are arranged so that they retract the mandrel 101 of each mandrel assembly 13 as the assemblies approach the loading positions 16 and 21. After the mandrels pass the loading positions the tracks are shaped to extend the mandrels and maintain the mandrels in the extended position until they approach the subsequent loading position. A gear 126 is mounted on the rearward end of the mandrel support tube for engagement with gear rack sections 127 and 128 to rotate the mandrels as they pass through the testing station and printing or branding station.

The forward end of the support sleeve 93 is formed with a radially extending flange 131 which supports a gripper mechanism, illustrated in FIGS. 16 through 20. The gripper mechanism has not been illustrated in FIGS. 11 through 15.

The gripper mechanism includes four links 132 through 135 with each link pivoted on the flange 131. The link 132 is pivoted at 136, the link 133 is pivoted at 137, the link 134 is pivoted at 138, and the link 135 is pivoted at 139. The links 132 through 135 are each provided with a spreader finger 141 mounted on the associated link at a point spaced from its pivot. Springs 142 connect adjacent links and resiliently bias the links in a direction moving the spreader arms 141 to the retracted position against the article support rod 106, illustrated in FIGS. 16 and 17. The various elements are proportioned so that the spreader arms 141 are symmetrically positioned around the article support rod 106 with ninety degree spacing between each arm.

Mounted on each link 132 and 134 is a gripper arm 143 having a rubber gripper end 144. When the links 132 and 134 are in the closed position the gripper arms are pivoted outward away from the article support rod 106, as best illustrated in FIG. 17. In this condition the article 146, illustrated in phantom, in FIGS. 17 through 20 is loosely supported with its closed end 147 on the end 112 of the article support rod 106 and the rim 148 at the article open end is spaced down along the article support rod 106. The rim 148 is around the spreader arms 141 which are retracted at this time and is inwardly spaced from the gripper portions 144.

As discussed previously, the article 146 is carried along the pneumatic conveyor 27a in a position with the closed end 147 foward and the rim 148 trailing. The conveyor outlet is in alignment with the article support rod 106 as the article exits from the exit portion 67 of the conveyor, so the closed end of the article engages the end 112 of the rod 106. The air blowing out of the conveyor and the inertia of the article causes the article to be turned insideout until the rim 148 at the open end of the article is in the position illustrated in FIG. 17. If the article is properly positioned, as illustrated in FIG. 17, it is not removed by the conveyor 28a.

As the mandrel assembly 13 is carried around the table 10 the cam tracks 119 and 121 cause the mandrel 101 to begin to extend, as illustrated in FIGS. 18 and 19. When this occurs the end of the mandrel engages the inner side of the spreader [arm] *arms* causing them to pivot outwardly rotating their associated links 132 through 135 in a clockwise direction between the position of FIG. 16 and the position of FIG. 18. This causes the spreader arms to spread the open end of the article and at the same time causes the gripper portions 144 to move inwardly until they press opposite sides of the article against corresponding spreader arms to grip the end of the article. Consequently the article is held against movement with the mandrel 101 as the mandrel extends until the article 146 is stretched tight over the mandrel 101 and the end of the mandrel is flush with the end of the article support rod 106.

Continued extension of the mandrel to the position of FIG. 20 is required to insure that the entire article extends clear of the grippers. Consequently longitudinal recesses 149 are provided in the mandrel support tube 102 which move under the spreader arms 141 and permit the arms to rotate inwardly and consequently cause outward movement of the gripper portions 144 to release the gripping of the open end of the article.

The spreader arms are each provided with a bearing shoe 151 rounded at their ends so that on retraction of the mandrel the spreader arms ride up out of the grooves 149. When the mandrel is in the fully retracted position these shoes 151 are positioned in an annular recess 152 on the article support rod 106, as illustrated in FIG. 17. Therefore, the spreader arms 141 lay tight against the exterior of the article support rod and the open end of the article does not catch *on the spreader arms* as it moves down along the article support rod and over the spreader arms.

With this structure separate power means for the operation of the gripper mechanism are not required and the extension and retraction movement of each mandrel synchronizes the operation of the associated gripper mechanism. Similarly, the extension and retraction of the mandrel is produced by the rotary movement of the ring 11 carrying the mandrel assemblies around the table 10. Therefore, the main power source for rotating the ring 11 provides all of the power for the operation of the mandrel assembly. With this structure it is not necessary to utilize special timing means since the proper timing is automatically built into the machine.

The operation of the entire machine is as follows. As the individual mandrel assemblies 13 approach the first and second loading stations 16 and 21, respectively, the mandrels 101 are retracted by the cam tracks 119 and 121. As soon as the article support rod 106 moves into alignment with the [exist] *exit* portion 67 of each of the pneumatic conveyors 27a and 27b the latch 72 on the end of the associated arm 68 engages the projection 74 of the mandrel assembly at the aligned position and the exit portion 67 of the conveyor is carried with the aligned mandrel assembly against the action of the springs 76. This operates to close the switches 66 and actuates the associated pick up mechanism which delivers a single, randomly oriented article 146 to the inlet or entrance 52 of the associated conveyor.

The article then passes through the orienter properly orienting the article, so that as the article exits through the exit section 67 it is properly positioned on the article support 106 as illustrated in FIG. 17.

If the article, for some reason, is not properly positioned on the article support the movement of the article support past the associated conveyor 28a or 28b causes the article to be removed and conveyed back to the associated supply container 14. Continued rotation of the mandrel assembly 13 around the table 10 carries the mandrel past a portion of the cam tracks 119 and 121 which produces extension of the mandrel 101. As the mandrel commences to extent the spreader arms 141 automatically spread the open end 148 of the article and cause the open end to be gripped between associated spreader arms 141 and gripper portions 144. Continued extension of the mandrel causes the article to be stretched over the mandrel until the grooves 149 move under the spreader arms and cause release of the gripping force. The mandrel then continues to extend to properly position the article for branding and testing. If the article properly passes the test at the testing stations 18 and 23 it is rolled off the mandrel and discharged into the container for satisfactory articles. On the other hand, if the article is imperfect in any way it is discharged into a reject container.

With a machine incorporating this invention the mounting of the articles on the test mandrel is completely automated even though the articles are received by the machine in a randomly oriented loose condition. Consequently the branding, testing and storing of articles is full automated and the cost of manufacture is thereby minimized.

Although a preferred embodiment of this invention is illustrated, it is to be understood that various modifications and rearrangements of parts may be resorted to without departing from the scope of the invention as defined in the following claims.

What is claimed is:

1. A machine for placing thin tubular rubber-like articles on a mandrel comprising conveyor means operable to receive randomly oriented articles in a collapsed condition and deliver such articles individually to a discharge location in a predetermined orientation with the article extended, and article receiving means including a mandrel operable to receive articles at said discharge location in said predetermined orientation and position said articles on said mandrel.

2. A machine as set forth in claim 1 wherein there are a plurality of article receiving means, said conveyor means and article receiving means moving relative to each other to sequentially position said conveyor means relative to each article receiving means in a receiving position in which said article receiving means receives articles from said conveyor means, the operation of said conveyor means being initiated in response to relative movement of an article receiving means said conveyor means to said receiving position.

3. A machine as set forth in claim 2 wherein said article receiving means are continuously movable, and means are provided to maintain said receiving position of said conveyor means and each article receiving means during a portion of the movement of the latter.

4. A machine for placing flexible tubular articles on a mandrel wherein said articles are closed at one end and open at the other end comprising an elongated mandrel, support means operable to loosely support an article with its open end adjacent to the end of said mandrel, gripper means operable to grip the open end of an article on said support means, and power means operable to produce relative movement between said mandrel and gripper means while said gripper means grips said article open end to pull said article over said mandrel.

5. A machine as set forth in claim 4 wherein said support means includes an elongated rod member telescoping from the end of said mandrel operable to loosely support an article in alignment with said mandrel.

6. A machine as set forth in claim 4 wherein said gripper means are operable from a release position to a gripping position, said gripper means when in said gripping position spreading the article open end to permit entry of the mandrel into the article open end.

7. A machine as set forth in claim 6 wherein said gripper means is moved to said gripping position in response to relative movement between said gripper means and mandrel.

8. A machine for handling thin tubular rubber articles which are closed at one end and open at the other end comprising an elongated support, means for retrieving randomly oriented collapsed articles and automatically positioning said articles over said support with the article closed end against one end of said support, gripper means operable to grip the open end of an article positioned on said support, a mandrel connected to said support, and power means connected to produce relative longitudinal movement between said support and mandrel while said gripper means hold said article until said article is stretched over said mandrel.

9. A machine as set forth in claim 8 wherein said mandrel and support telescope relative to each other from a retracted position wherein said mandrel is spaced from said one end of said support and a second position in which said article is stretched over said mandrel and the end of said mandrel is adjacent to said end of said support.

10. A machine as set forth in claim 9 wherein said gripper means operate to grip said open end of said article in response to movement of said mandrel from said retracted position.

11. A machine as set forth in claim 10 wherein said mandrel and said support move together relative to said gripper means beyond said second position to an extended position, and said gripper means release in response to movement beyond said second position.

12. [A] *In combination, a* conveyor system for thin, flexible, tubular articles closed at one end, open at the other end and having a thickened rim around said open end comprising conveyor tube means having a passage therethrough, and means producing *a* flow of air through said passage, said conveyor tube means including orienting means [operating] *disposed therein and acting on the articles passing therethrough one after another* to extend and orient *the* articles [passing therethrough] in a predetermined orientation with the closed end forward and the open end trailing *; receiving and positioning means operative to engage and coact with the articles in said predetermined orientation as they are discharged from said conveyor system to position the articles for performing a subsequent operation thereon.*

13. [A conveyor system as set forth in] *The combination of* claim 12 wherein said orienting means produces a plurality of abrupt changes in the direction of movement of an article passing therethrough.

14. [A conveyor system as set forth in] *The combination of* claim 12 wherein said orienting means provide a plurality of longitudinally spaced restricted passage sections resisting the passage of said rim to assist in producing said predetermined orientation as said articles pass therethrough.

15. [A conveyor system as set forth in] *The combination of* claim 14 wherein said restrictions are provided by longitudinally spaced laterally extending walls projecting into said passage from opposite sides thereof.

16. [A conveyor system as set forth in] *The combination of* claim 15 wherein said walls are inclined with respect to the longitudinal length of said passage.

17. [A conveyor system as set forth in] *The combination of* claim 16 wherein said walls are substantially parallel to each other.

18. [A conveyor system as set forth in] *The combination of* claim 12 wherein said system includes transfer means operable to remove randomly oriented single articles from a container and separately deliver said single articles to the inlet of said conveyor tube means.

19. [A conveyor system as set forth in] *The combination of* claim 18 wherein said transfer means includes a hollow arm having an end movable from said container to said inlet, vacuum means supplying a vacuum to said open end, and means operable when said end is adjacent to said inlet to release said vacuum.

20. [A conveyor system as set forth in] *The combination of* claim 19 wherein said means producing flow includes a nozzle spaced from and aligned with said inlet operable to produce a jet of air blowing said articles from the end of said arm into said conveyor tube means.

21. [A conveyor system as set forth in] *The combination of* claim 18 wherein *said receiving and positioning means includes* a plurality of article receiving *and positioning* means *which* are sequentially movable into a position to receive articles from said conveyor tube means, and the operation of said transfer means is initiated in response to movement of said article receiving means into said position.

22. [A conveyor system as set forth in] *The combination of* claim 12 [including] *wherein said receiving and positioning means includes* an elongated support arranged so that an article leaving said conveyor tube is loosely positioned thereon with the article closed end against one end of said support, gripper means operable to grip the open end of an article positioned on said support, a mandrel connected to said support, and power means connected to produce relative longitudinal movement between said support and mandrel while said gripper means holds said article until said article is stretched over said mandrel.

*23. A conveyor system for thin, flexible, tubular articles closed at one end, open at the other end and having a thickened rim around said open end, said system comprising a container for holding a supply of said articles in randomly oriented positions; transfer means for picking up articles from said container, one at a time, and positioning and releasing them for travel into and through a conveyor tube; an open ended conveyor tube having an inlet end disposed for receiving articles one at a time from said transfer means; and means producing a flow of air through the conveyor tube from said inlet end thereof; said conveyor tube including orienting means therein operating to extend and open the articles passing therethrough while orienting them in a predetermined orientation with their closed end forward and their open end trailing and to discharge the articles one at a time in said predetermined orientation to an article receiving and positioning means adapted to engage and coact with the articles in their open condition and in said predetermined orientation to position the articles for performing a subsequent operation thereon; and control means synchronizing the operation of said article receiving and positioning means with passage of the articles one by one through the conveyor means.*

*24. A conveyor system as set forth in claim 23 wherein said transfer means includes a hollow arm having an open end movable from said container to said conveyor tube inlet, vacuum means supplying a vacuum to said open end of said hollow arm, and means operable when said open end is adjacent said conveyor tube inlet to release said vacuum.*

*25. A conveyor system as set forth in claim 24 wherein said means producing said flow of air through said conveyor tube includes a nozzle spaced from and aligned with said inlet end of said conveyor tube and operable to produce a jet of air blowing said articles from the open end of said hollow arm into said conveyor tube.*

* * * * *